(12) United States Patent
Iyer et al.

(10) Patent No.: US 10,747,327 B2
(45) Date of Patent: Aug. 18, 2020

(54) TECHNOLOGIES FOR ADAPTIVE DOWNSAMPLING FOR GESTURE RECOGNITION

(71) Applicant: Intel Corporation, Santa Clara, CA (US)

(72) Inventors: Darshan Iyer, Portland, OR (US); Nilesh K. Jain, Beaverton, OR (US); Zhiqiang Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 849 days.

(21) Appl. No.: 15/195,604

(22) Filed: Jun. 28, 2016

(65) Prior Publication Data

US 2017/0371417 A1 Dec. 28, 2017

(51) Int. Cl.
*G06F 3/0346* (2013.01)
*G06F 3/01* (2006.01)
*G06K 9/00* (2006.01)
*G06K 9/62* (2006.01)

(52) U.S. Cl.
CPC ............ *G06F 3/017* (2013.01); *G06F 3/0346* (2013.01); *G06K 9/00335* (2013.01); *G06K 9/6218* (2013.01)

(58) Field of Classification Search
None
See application file for complete search history.

(56) References Cited

U.S. PATENT DOCUMENTS

| | | | |
|---|---|---|---|
| 6,720,984 B1 * | 4/2004 | Jorgensen | G06F 3/015 600/300 |
| 9,448,636 B2 * | 9/2016 | Balzacki | G06F 3/017 |
| 10,325,184 B2 * | 6/2019 | Brunner | G06K 9/6282 |
| 2012/0119984 A1 * | 5/2012 | Sankarasubramaniam | G06F 3/017 345/156 |
| 2012/0183203 A1 * | 7/2012 | Han | G06K 9/00201 382/154 |

(Continued)

FOREIGN PATENT DOCUMENTS

CN 107403442 A * 11/2017

OTHER PUBLICATIONS

Jiayang Liu, Lin Zhong, Jehan Wickramasuriya, and Venu Vasudevan, "uWave: Accelerometer-based personalized gesture recognition and its applications," Pervasive and Mobile Computing 5 (2009) 657-675.

(Continued)

*Primary Examiner* — Temesghen Ghebretinsae
*Assistant Examiner* — Karin Kiyabu
(74) *Attorney, Agent, or Firm* — Barnes & Thornburg LLP (57) ABSTRACT

Technologies for gesture recognition using downsampling are disclosed. A gesture recognition device may capture gesture data from a gesture measurement device, and downsample the captured data to a predefined number of data points. The gesture recognition device may then perform gesture recognition on the downsampled gesture data to recognize a gesture, and then perform an action based on the recognized gesture. The number of data points to which to downsample may be determined by downsampling to several different numbers of data points and comparing the performance of a gesture recognition algorithm performed on the downsampled gesture data for each different number of data points.

19 Claims, 5 Drawing Sheets

(56) References Cited

U.S. PATENT DOCUMENTS

| | | | | |
|---|---|---|---|---|
| 2012/0323521 | A1* | 12/2012 | De Foras | G06F 3/017 702/141 |
| 2013/0249818 | A1* | 9/2013 | Zhai | G06F 3/04886 345/173 |
| 2015/0077322 | A1* | 3/2015 | Mittal | G06F 3/017 345/156 |
| 2016/0224123 | A1* | 8/2016 | Antoniac | G06F 3/017 |
| 2019/0102646 | A1* | 4/2019 | Redmon | G06K 9/4619 |

OTHER PUBLICATIONS

Yang Li, "Protractor: A Fast and Accurate Gesture Recognizer," CHI conference, Apr. 10-15, 2010.

* cited by examiner

TECHNOLOGIES FOR ADAPTIVE DOWNSAMPLING FOR GESTURE RECOGNITION

BACKGROUND

Enabling a compute device to recognize gestures of a user allows for additional input modes to that compute device. This additional input mode can be particularly useful in devices with limited input mechanisms, such as wearable devices. Many gesture recognition algorithms work best when the user carries out a training procedure specific to that user, such as by performing a known set of gestures multiple times, which are then analyzed and used to adapt the gesture recognition algorithm to suit that particular user.

Since different users (or the same user at different times) may perform gestures at different speeds, dynamic time warping is often used to allow comparison between gestures performed at different speeds. The dynamic time warping is computationally intensive, particularly for devices with relatively low computing power, such as wearable devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
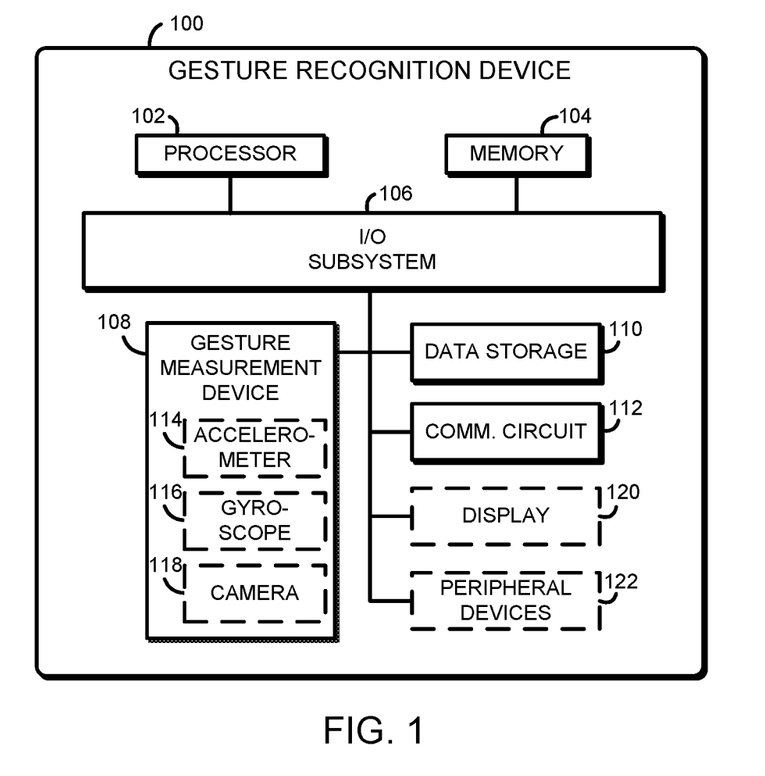
FIG. 1 is a simplified block diagram of at least one embodiment of a gesture recognition device.

Referring now to FIG. 1, an illustrative gesture recognition device 100 includes a gesture measurement device 108. In use and as described in more detail below, the illustrative gesture recognition device 100 captures gesture data of a user by using the gesture measurement device 108. The gesture recognition device 100 downsamples the gesture data to a fixed, predefined number of data points by, for example, using a smoothing window with a variable window size. The downsampled gesture data is compared to the model gesture developed using training data that has the same number of data points by, for example, using pattern matching techniques. The fact that the model gesture based on the training data and the gesture data have the same number of data points allows for a comparison between the two data sets using an algorithm that may be more accurate and/or less computationally intensive. Once the gesture data is matched to a model gesture, the gesture recognition device 100 may perform an action based on the gesture, such as launching a program or sending a message.

The gesture recognition device 100 may be embodied as any type of compute device capable of performing the functions described herein. For example, the gesture recognition device 100 may be embodied as or otherwise be included in, without limitation, a wearable computer, a smartphone, a cellular phone, an embedded computing system, a System-on-a-Chip (SoC), a desktop computer, a server computer, a tablet computer, a notebook computer, a laptop computer, a handset, a messaging device, a camera device, a multiprocessor system, a processor-based system, a consumer electronic device, and/or any other compute device. The illustrative gesture recognition device 100 includes a processor 102, a memory 104, an input/output (I/O) subsystem 106, the gesture measurement device 108, data storage 110, and a communication circuit 112. In some embodiments, one or more of the illustrative components of the gesture recognition device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the gesture recognition device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the gesture recognition device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the gesture recognition device 100 on a single integrated circuit chip.

The gesture measurement device 108 may be embodied as any type of device capable of measuring a gesture of the users. In the illustrative embodiment, the gesture measurement device 108 is embodied as an accelerometer 114, which is capable of measuring linear acceleration of the accelerometer 114 in three different directions. In other embodiments, the accelerometer 114 may be capable of measuring linear acceleration of the accelerometer 114 in only one or two different directions. The accelerometer 114 may be any type of accelerometer, such as a micro electromechanical system (MEMS) accelerometer. In some embodiments, the gesture measurement device 108 may include a gyroscope 116, which may be capable of measuring the angular position of the gyroscope 116 in one, two, or three different directions. The gyroscope 116 may be any type of gyroscope, such as a MEMS gyroscope. Some embodiments may include both an accelerometer 114 and a gyroscope 116, for a total of up to six independent measurements. In some cases, an auxiliary device such as a magnetometer may be used as well.

Additionally or alternatively, the gesture measurement device 108 may include a camera 118. The camera 118 may be embodied as any type of device capable of sensing or capturing one or more image(s). For example, the camera 118 may be embodied as, or otherwise include a charge-coupled device (CCD) image sensor, a complementary metal-oxide-semiconductor (CMOS) image sensor, and/or other type of image sensor technology. Additionally, the camera 118 may be embodied as a two-dimensional or a three-dimensional camera (i.e., configured to capture/generate 2D or 3D images). The camera 118 may be configured to capture single or multiple images (e.g., video), and may sense visible light and/or invisible light, including infrared light, thermal light, ultra-violet light, x-rays, and/or the like. Of course, the gesture measurement devices 108 may include additional or other devices capable of measuring or detecting a gesture of the user in other embodiments.

The data storage 110 may be embodied as any type of device or devices configured for the short-term or long-term storage of data. For example, the data storage 110 may include any one or more memory devices and circuits, memory cards, hard disk drives, solid-state drives, or other data storage devices.

The communication circuit 112 may be embodied as any type of communication circuit, device, or collection thereof, capable of enabling communications between the gesture recognition device 100 and other devices. To do so, the communication circuit 112 may be configured to use any one or more communication technology and associated protocols (e.g., Ethernet, Bluetooth®, Wi-Fi®, WiMAX, near field communication (NFC), etc.) to effect such communication.

Of course, in some embodiments, the gesture recognition device 100 may include other or additional components, such as those commonly found in a compute device. For example, the gesture recognition device 100 may also have a display 120 and/or peripheral devices 122 such as a keyboard, a mouse, etc.

The display 120 may be embodied as any type of display on which information may be displayed to a user of the gesture recognition device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 2:
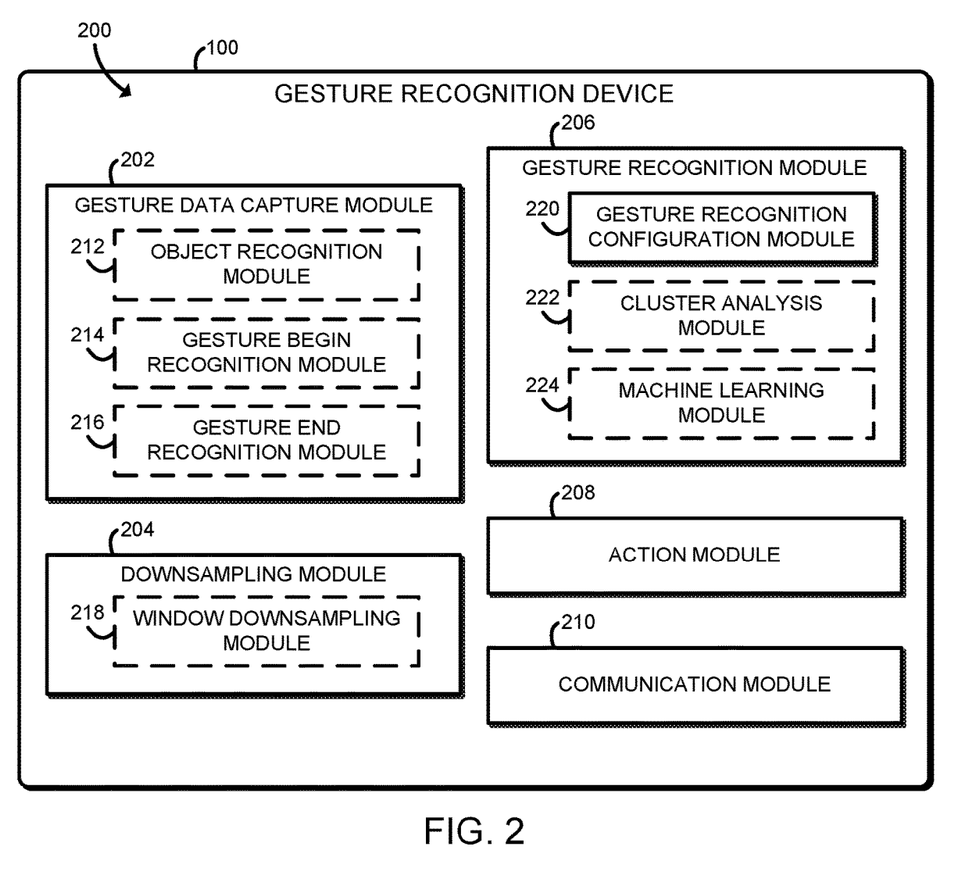
FIG. 2 is a block diagram of at least one embodiment of an environment that may be established by the gesture recognition device of FIG. 1.

Referring now to FIG. 2, in use, the gesture recognition device 100 may establish an environment 200. The illustrative environment 200 includes a gesture data capture module 202, a downsampling module 204, a gesture recognition module 206, an action module 208, and a communication module 210. The various modules of the environment 200 may be embodied as hardware, software, firmware, or a combination thereof. For example, the various modules, logic, and other components of the environment 200 may form a portion of, or otherwise be established by, the processor 102 or other hardware components of the gesture recognition device 100. As such, in some embodiments, one or more of the modules of the environment 200 may be embodied as circuitry or collection of electrical devices (e.g., a gesture data capture circuit 202, a downsampling circuit 204, a gesture recognition circuit 206, etc.). It should be appreciated that, in such embodiments, one or more of the circuits (e.g., the gesture data capture circuit 202, the downsampling circuit 204, the gesture recognition circuit 206, etc.) may form a portion of one or more of the processor 102, the memory 104, the I/O subsystem 106, and/or the data storage 110. Additionally, in some embodiments, one or more of the illustrative modules may form a portion of another module and/or one or more of the illustrative modules may be independent of one another.

The gesture data capture module 202 is configured to capture or otherwise acquire gesture data of a gesture performed by a user of the gesture recognition device 100. In the illustrative embodiment, the gesture data capture module 202 captures gesture data from the gesture measurement device 108. Additionally or alternatively, the gesture data capture module 202 may acquire gesture data that has been previously captured from the gesture measurement device 108 or from a gesture measurement device of a different compute device, such as by accessing data storage 110 or by receiving the gesture data from the communication circuit 112. In the illustrative embodiment, the gesture data indicates the linear acceleration of the gesture measurement device 108 as a function of time. Additionally or alternatively, the gesture data may indicate the linear position, linear velocity, angular position, angular velocity, angular acceleration, etc. of the gesture measurement device 108 as a function of time. In some embodiments, the gesture data may indirectly indicate the linear acceleration, linear velocity, etc. of the gesture measurement device 108 after the gesture data has been manipulated or transformed.

In some embodiments, such as embodiments with the camera 118, the gesture data capture module 202 includes an object recognition module 212. The object recognition module 212 is configured to analyze one or more images captured from the camera 118 to recognize an object and determine its position in the one or more images. For example, the object recognition module 212 may recognize the hand of a user in the images, and determine the position of the user's hand over the course of several images. The gesture data would then indicate the position of the user's hand as a function of time as determined by the object recognition module 212.

The gesture data capture module 202 may in some embodiments include a gesture begin recognition module 214 and a gesture end recognition module 216. The gesture begin recognition module 214 is configured to continually or continuously monitor the gesture measurement device 108 for a begin gesture, which the user may use to indicate to the gesture data capture module 202 that a gesture is about to begin. The begin gesture may be a relatively simple gesture, such as a double twist of a gesture measurement device 108 that may be on the user's wrist. Similarly, the gesture end recognition module 216 is configured to continually or continuously monitor the gesture measurement device 108 for an end gesture after a begin gesture has been recognized. The end gesture may be the same as or similar to the begin gesture.

The downsampling module 204 is configured to downsample the gesture data to a predefined number of data points, regardless of the number of initial data points of the gesture data. While a larger number of data points may in principle contain more information and allow for better pattern recognition, using too many data points may require more computing resources or may result in a specific pattern-matching algorithm performing worse, particularly with a small amount of training data. Downsampling involves lowpass filtering accomplished by averaging data within each window, which may eliminate unwanted higher frequencies caused by irrelevant movements such as tremors, shaking, etc.

The downsampling module 204 may use any downsampling technique to downsample the data to the desired number of data points. In some embodiments, the downsampling module 204 uses a window downsampling module 218, which applies a window to select a certain number of data points, and then generates a single downsampled data point based on the data points in the window, such as by averaging all of the data points in the window. In the illustrative embodiment, the size of the window depends on the number of data points in the gesture data and in the downsampled gesture data. In other embodiments, the size of the window may be fixed. In the illustrative embodiment, the windows are applied to the gesture data are nonoverlapping. In some embodiments, the windows applied to the gesture data may be overlapping, and may not include every data point of the gesture data.

The gesture recognition module 206 is configured to recognize a gesture based on the downsampled gesture data. The gesture recognition module 206 may use any technique for performing a pattern recognition, such as by using a machine learning module 224. The gesture recognition module 206 includes a gesture recognition configuration module 220. The gesture recognition configuration module 220 is configured to obtain training data and determine parameters for the gesture recognition algorithm, such as the number of data points to which the gesture data should be downsampled.

The training data includes several training gesture data sets of one or more users, wherein each training gesture data set corresponds to a single user performing a single gesture once. In the illustrative embodiment, the gesture the user is performing for each training gesture data set may be known (i.e., labeled). In some embodiments, the gesture may be determined as part of performing a gesture recognition algorithm on the training data.

The gesture recognition configuration module 220 may downsample each training gesture data set into several downsampled training gesture data sets for several different sizes of downsampled training data, and then perform gesture recognition on all of the downsampled training gesture data sets. The gesture recognition configuration module 220 may then determine an average performance for each group of downsampled training gesture data sets that were downsampled to the same number of data points. For example, the gesture recognition configuration module 220 may downsample each training gesture data set from the initial number of data points to each of 100, 99, 98, 97 . . . 3, 2, 1 data points, and then perform gesture recognition on all of the training gesture data sets that have the same number of data points. The gesture recognition configuration module 220 may then determine the performance of a gesture recognition algorithm performed on each training gesture data set having 100 data points, and compare the performance of the gesture recognition algorithm performed on each training gesture data set having 99 points. By such a comparison, a preferred number of data points to which the gesture data should be downsampled can be determined. In comparing the performance of the gesture recognition algorithm, the gesture recognition configuration module 220 may take into account several metrics of the performance such as false positive rate, false negative rate, true positive rate, true negative rate, recall, precision, F1-score, etc.

The cluster analysis module 222 is configured to perform a clustering algorithm on the downsampled training data to build a model gesture to use for classifying gesture data. The clustering algorithm may be any type of clustering algorithm, such as a k-means algorithm or hierarchical clustering. A model gesture is a typical or average gesture determined from the training data for that gesture, and may be used in the pattern recognition algorithm used to classify gesture data. The machine learning module 224 may employ any machine-learning-based algorithm such as a neural network (including a deep neural network), a support vector machine, etc. The machine-learning-based algorithm may be trained using the training data and/or the model gestures.

The action module 208 is configured to perform an action based on the recognized gesture. For example, the action module 208 may launch an application or send a message based on the recognized gesture. In some embodiments, the action module 208 may send an indication of the recognized gesture to another compute device.

The communication module 210 is configured to communicate with other compute devices. As discussed above, the communication module 210 may communicate through, for example, Ethernet, Bluetooth®, Wi-Fi®, WiMAX, near field communication (NFC), etc.

Figure 3:
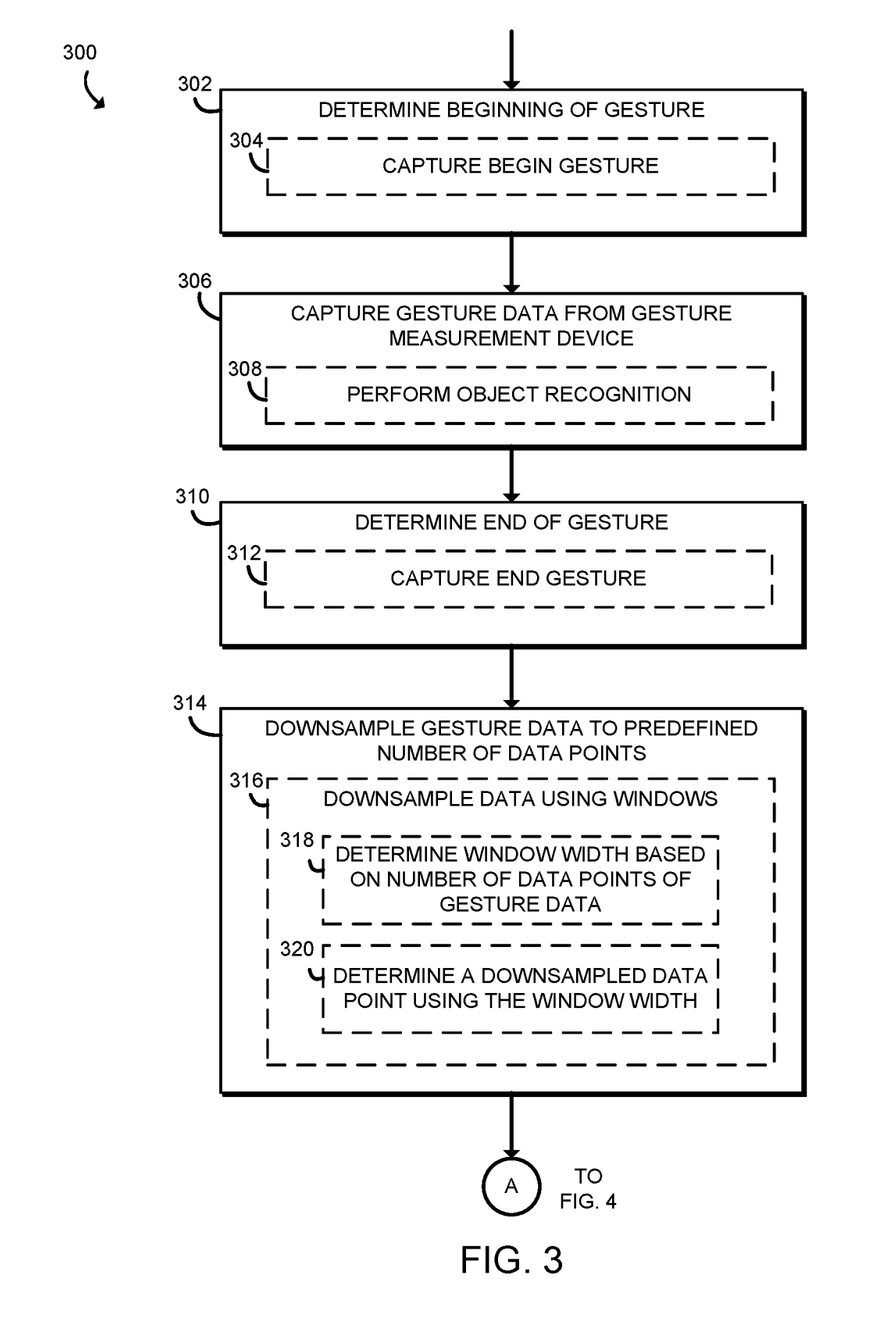
FIGS. 3 & 4 are a simplified flow diagram of at least one embodiment of a method for performing a gesture recognition algorithm that may be executed by the gesture recognition device of FIG. 1.

Referring now to FIG. 3, in use, the gesture recognition device 100 may execute a method 300 for performing a gesture recognition algorithm. It should be appreciated that, in some embodiments, the techniques of the method 300 may be executed by one or more of the modules of the gesture recognition device 100 as shown in FIG. 2. The method 300 begins in block 302, in which the gesture recognition device 100 determines a beginning of a gesture. In some embodiments, the gesture recognition device 100 may determine the beginning of a gesture by capturing a begin gesture in block 304. In other embodiments, the user may provide an indication a gesture is about to begin, such as by pressing a button.

In block 306, the gesture recognition device 100 captures gesture data from the gesture measurement device 108. In some embodiments, such as ones with a camera 118, the gesture recognition device 100 performs object recognition on one or more images captured by the camera 118 in block 308.

In block 310, the gesture recognition device 100 determines an end of a gesture. In some embodiments, the gesture recognition device 100 may determine the end of the gesture by capturing an end gesture in block 312. In other embodiments, the user may provide an indication the gesture has ended, such as by pressing or releasing a button.

In block 314, the gesture recognition device 100 downsamples the gesture data to a predefined number of data points. In some embodiments, the gesture recognition device 100 may use windows to perform the downsampling in block 316. As part of performing the downsampling with windows, the gesture recognition device 100 may determine a window width based on the number of data points that are in the gesture data prior to downsampling in block 318, and may in block 320 determine a downsampled data point using a window of the width that was determined in block 318.

Figure 4:
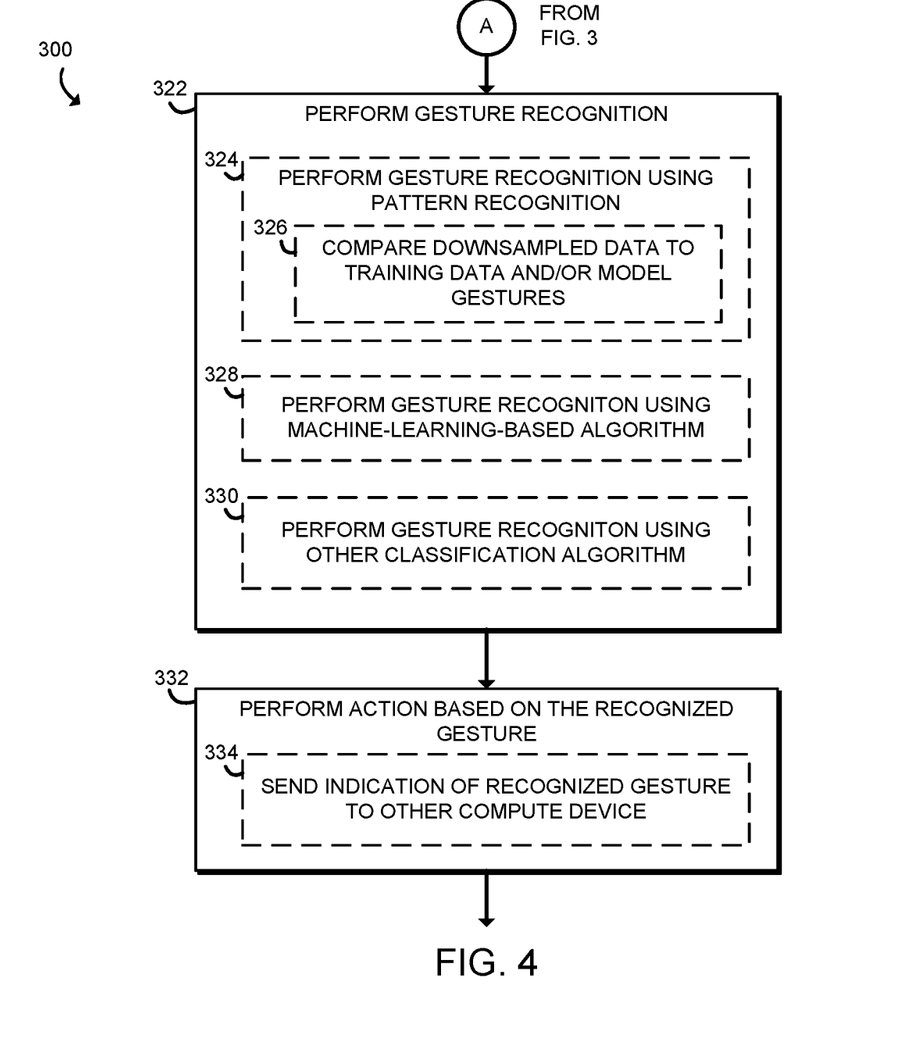

After the gesture recognition device 100 has downsampled the gesture data in block 314, the method 300 advances to block 322 of FIG. 4. In block 322 the gesture recognition device 100 performs gesture recognition on the downsampled gesture data. In some embodiments, the gesture recognition device 100 performs gesture recognition using pattern recognition in block 324, and may compare the gesture data to training data and/or model gestures in block 326. In other embodiments, the gesture recognition device 100 performs gesture recognition using a machine-learning-based algorithm in block 328. In still other embodiments, the gesture recognition device 100 performs gesture recognition using another classification algorithm in block 330.

In block 332, the gesture recognition device 100 performs an action based on the recognized gesture, such as launching an application or sending a message. In some embodiments, the gesture recognition device 100 may send an indication of the recognized gesture to another compute device in block 334.

Figure 5:
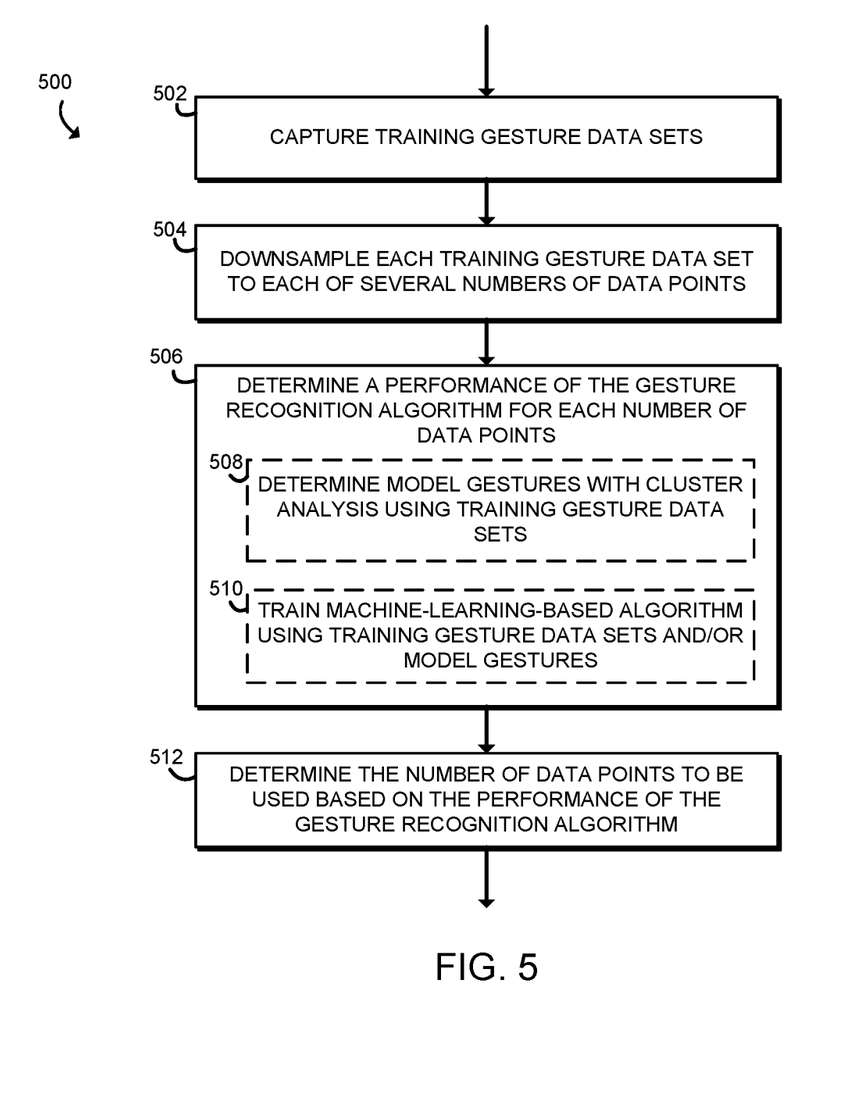
FIG. 5 is a simplified flow diagram of at least one embodiment of a method for determining parameters and training data for a gesture recognition algorithm that may be executed by the gesture recognition device of FIG. 1.

Referring now to FIG. 5, in use, the gesture recognition device 100 may execute a method 500 for determining parameters using the training data for the gesture recognition algorithm. It should be appreciated that, in some embodiments, the techniques of the method 500 may be executed by one or more of the modules of the gesture recognition device 100 as shown in FIG. 2. The method 500 begins in block 502 in which the gesture recognition device 100 captures training gesture data sets by capturing gesture data from training users performing gestures.

In block 504, the gesture recognition device 100 downsamples each training gesture data set to each of several numbers of data points. In block 506, the gesture recognition device 100 determines a performance of a gesture recognition algorithm for each number of data points to which the training gesture data sets are downsampled. In some embodiments, the gesture recognition device 100 may determine model gestures with cluster analysis using the training gesture data sets in block 508. In other embodiments, the gesture recognition device 100 may additionally or alternatively train a machine-learning-based algorithm using training gesture data sets in block 510.

In block 512, the gesture recognition device 100 determines the preferred number of data points to which the gesture data should be downsampled based on the performance of the gesture recognition algorithm with the different numbers of data points.

It should be appreciated that the techniques disclosed herein may be applied to applications beyond those explicitly disclosed above. For example, the downsampling techniques disclosed herein may be applied to other scenarios where dynamic time warping or other time warping methods may be used.

EXAMPLES

Illustrative examples of the devices, systems, and methods disclosed herein are provided below. An embodiment of the devices, systems, and methods may include any one or more, and any combination of, the examples described below.

Example 1 includes a gesture recognition device comprising a gesture measurement device to produce gesture data indicative of a gesture motion of a user of the gesture recognition device; a gesture data capture module to capture the gesture data from the gesture measurement device, wherein the gesture data is defined by a first number of data points; a downsampling module to downsample the gesture data from the first number of data points to a second number of data points to generate downsampled data, wherein the second number is predefined and less than the first number; and a gesture recognition module to recognize, based on the downsampled data, a gesture of the user.

Example 2 includes the subject matter of Example 1, and further including an action module to perform an action based on the recognized gesture of the user.

Example 3 includes the subject matter of any of Examples 1 and 2, and wherein the gesture measurement device comprises one or more accelerometers, and wherein the gesture data comprises acceleration data.

Example 4 includes the subject matter of any of Examples 1-3, and wherein the gesture measurement device comprises a camera, wherein to capture the gesture data comprises to captures images from the camera and to perform object recognition on an object in the images; and wherein the gesture data indicates a position of the object as a function of time.

Example 5 includes the subject matter of any of Examples 1-4, and wherein the training data comprises model gestures.

Example 6 includes the subject matter of any of Examples 1-5, and wherein the gesture recognition module is further to perform cluster analysis on downsampled training gesture data to generate the model gestures.

Example 7 includes the subject matter of any of Examples 1-6, and wherein to recognize the gesture of the user comprises to apply a machine-learning-based algorithm, wherein the machine-learning-based algorithm has been trained using training data.

Example 8 includes the subject matter of any of Examples 1-7, and wherein the gesture data capture module is further to determine a beginning of the gesture and an end of the gesture, and wherein the gesture data comprises data captured after the beginning of the gesture and before the end of the gesture.

Example 9 includes the subject matter of any of Examples 1-8, and wherein to determine the beginning of the gesture comprises to capture begin gesture data indicative of a begin gesture motion of the user; and recognize a begin gesture based on the begin gesture data; and wherein to determine the end of the gesture comprises to capture end gesture data indicative of an end gesture motion of the user; and recognize an end gesture based on the end gesture data.

Example 10 includes the subject matter of any of Examples 1-9, and wherein the downsampling module is to determine the second number prior to the capture of the gesture data.

Example 11 includes the subject matter of any of Examples 1-10, and wherein to determine the second number comprises to acquire training data, wherein the training data is indicative of a plurality of training gesture data sets of a plurality of training users; downsample each of the plurality of training gesture data sets to each of a plurality of numbers of data points; perform a gesture recognition algorithm on each of the plurality of training gesture data sets for each of the plurality of numbers of data points; determine a performance of the gesture recognition algorithm for each of the plurality of numbers of data points; and determine the second number based on the performance of the gesture recognition algorithm for each of the plurality of numbers of data points.

Example 12 includes the subject matter of any of Examples 1-11, and wherein to downsample the gesture data comprises to determine a window size based on the first number of data points; and determine, for each of the second number of data points, a downsampled data point based on an average of data points of the gesture data in a corresponding window of the window size.

Example 13 includes the subject matter of any of Examples 1-12, and wherein the windows associated with each of the second number of data points are non-overlapping.

Example 14 includes a method for gesture recognition with a gesture recognition device, the method comprising producing, by a gesture measurement device of the gesture recognition device, gesture data indicative of a gesture motion of a user of the gesture recognition device; capturing, by the gesture recognition device, the gesture data from the gesture measurement device, wherein the gesture data is defined by a first number of data points; downsampling, by the gesture recognition device, the gesture data from the first number of data points to a second number of data points to generate downsampled data, wherein the second number is predefined and less than the first number; and recognizing, by the gesture recognition device and based on the downsampled data, a gesture of the user.

Example 15 includes the subject matter of Example 14, and further including performing, by the gesture recognition device, an action based on the recognized gesture of the user.

Example 16 includes the subject matter of any of Examples 14 and 15, and wherein the gesture measurement device comprises one or more accelerometers, and wherein the gesture data comprises acceleration data.

Example 17 includes the subject matter of any of Examples 14-16, and wherein the gesture measurement device comprises a camera, wherein capturing the gesture data comprises capturing images from the camera and performing object recognition on an object in the images; and wherein the gesture data indicates a position of the object as a function of time.

Example 18 includes the subject matter of any of Examples 14-17, and wherein the training data comprises model gestures.

Example 19 includes the subject matter of any of Examples 14-18, and further including performing, by the gesture recognition device, cluster analysis on downsampled training gesture data to generate the model gestures.

Example 20 includes the subject matter of any of Examples 14-19, and wherein recognizing the gesture of the user comprises applying a machine-learning-based algorithm, wherein the machine-learning-based algorithm has been trained using training data.

Example 21 includes the subject matter of any of Examples 14-20, and further including determining, by the gesture recognition device, a beginning of the gesture and an end of the gesture, and wherein the gesture data comprises data captured after the beginning of the gesture and before the end of the gesture.

Example 22 includes the subject matter of any of Examples 14-21, and wherein determining the beginning of the gesture comprises capturing begin gesture data indicative of a begin gesture motion of the user; and recognizing a begin gesture based on the begin gesture data; and wherein determining the end of the gesture comprises capturing end gesture data indicative of an end gesture motion of the user; and recognizing an end gesture based on the end gesture data.

Example 23 includes the subject matter of any of Examples 14-22, and further including determining, by the gesture recognition device, the second number prior to capturing the gesture data.

Example 24 includes the subject matter of any of Examples 14-23, and wherein determining the second number comprises acquiring training data, wherein the training data is indicative of a plurality of training gesture data sets of a plurality of training users; downsampling each of the plurality of training gesture data sets to each of a plurality of numbers of data points; performing a gesture recognition algorithm on each of the plurality of training gesture data sets for each of the plurality of numbers of data points; determining a performance of the gesture recognition algorithm for each of the plurality of numbers of data points; and determining the second number based on the performance of the gesture recognition algorithm for each of the plurality of numbers of data points.

Example 25 includes the subject matter of any of Examples 14-24, and wherein downsampling the gesture data comprises determining a window size based on the first number of data points; and determining, for each of the second number of data points, a downsampled data point based on an average of data points of the gesture data in a corresponding window of the window size.

Example 26 includes the subject matter of any of Examples 14-25, and wherein the windows associated with each of the second number of data points are non-overlapping.

Example 27 includes one or more machine-readable media comprising a plurality of instructions stored thereon that, when executed, cause a gesture recognition device to perform the method of any of Examples 14-26.

Example 28 includes a gesture recognition device comprising means for producing, by a gesture measurement device of the gesture recognition device, gesture data indicative of a gesture motion of a user of the gesture recognition device; means for capturing the gesture data from the gesture measurement device, wherein the gesture data is defined by a first number of data points; means for downsampling the gesture data from the first number of data points to a second number of data points to generate downsampled data, wherein the second number is predefined and less than the first number; and means for recognizing, based on the downsampled data, a gesture of the user.

Example 29 includes the subject matter of Example 28, and further including means for performing an action based on the recognized gesture of the user.

Example 30 includes the subject matter of any of Examples 28 and 29, and wherein the gesture measurement device comprises one or more accelerometers, and wherein the gesture data comprises acceleration data.

Example 31 includes the subject matter of any of Examples 28-30, and wherein the gesture measurement device comprises a camera, wherein the means for capturing the gesture data comprises means for capturing images from the camera and performing object recognition on an object in the images; and wherein the gesture data indicates a position of the object as a function of time.

Example 32 includes the subject matter of any of Examples 28-31, and wherein the training data comprises model gestures.

Example 33 includes the subject matter of any of Examples 28-32, and further including means for performing cluster analysis on downsampled training gesture data to generate the model gestures.

Example 34 includes the subject matter of any of Examples 28-33, and wherein the means for recognizing the gesture of the user comprises means for applying a machine-learning-based algorithm, wherein the machine-learning-based algorithm has been trained using training data.

Example 35 includes the subject matter of any of Examples 28-34, and further including means for determining a beginning of the gesture and an end of the gesture, and wherein the gesture data comprises data captured after the beginning of the gesture and before the end of the gesture.

Example 36 includes the subject matter of any of Examples 28-35, and wherein the means for determining the beginning of the gesture comprises means for capturing begin gesture data indicative of a begin gesture motion of the user; and means for recognizing a begin gesture based on the begin gesture data; and wherein the means for determining the end of the gesture comprises means for capturing end gesture data indicative of an end gesture motion of the user; and means for recognizing an end gesture based on the end gesture data.

Example 37 includes the subject matter of any of Examples 28-36, and further including means for determining the second number prior to capturing the gesture data.

Example 38 includes the subject matter of any of Examples 28-37, and wherein the means for determining the second number comprises means for acquiring training data, wherein the training data is indicative of a plurality of training gesture data sets of a plurality of training users; means for downsampling each of the plurality of training gesture data sets to each of a plurality of numbers of data points; means for performing a gesture recognition algorithm on each of the plurality of training gesture data sets for each of the plurality of numbers of data points; means for determining a performance of the gesture recognition algorithm for each of the plurality of numbers of data points; and means for determining the second number based on the performance of the gesture recognition algorithm for each of the plurality of numbers of data points.

Example 39 includes the subject matter of any of Examples 28-38, and wherein downsampling the gesture data comprises means for determining a window size based on the first number of data points; and means for determining, for each of the second number of data points, a downsampled data point based on an average of data points of the gesture data in a corresponding window of the window size.

Example 40 includes the subject matter of any of Examples 28-39, and wherein the windows associated with each of the second number of data points are non-overlapping.

The invention claimed is:

1. A gesture recognition device comprising:
    a gesture measurement device to produce gesture data indicative of a gesture motion of a user of the gesture recognition device;
    a gesture data capture module to capture the gesture data from the gesture measurement device, wherein the gesture data is defined by a first number of data points;
    a downsampling module to:
        acquire training data, wherein the training data is indicative of a plurality of training gesture data sets of a plurality of training users;
        downsample each of the plurality of training gesture data sets to each of a plurality of numbers of data points;
        perform a gesture recognition algorithm on each of the plurality of training gesture data sets for each of the plurality of numbers of data points;
        determine a performance of the gesture recognition algorithm for each of the plurality of numbers of data points;
        determine a second number of data points based on the performance of the gesture recognition algorithm for each of the plurality of numbers of data points and prior to the capture of the gesture data; and
        downsample the gesture data from the first number of data points to the second number of data points to generate downsampled data, wherein the second number is predefined, less than the first number, and independent of the first number; and
    a gesture recognition module to recognize, based on the downsampled data, a gesture of the user.

2. The gesture recognition device of claim 1, further comprising an action module to perform an action based on the recognized gesture of the user.

3. The gesture recognition device of claim 1, wherein the gesture measurement device comprises one or more accelerometers, and wherein the gesture data comprises acceleration data.

4. The gesture recognition device of claim 1, wherein the gesture recognition module is further to generate model gestures based on the training data,
    wherein to recognize the gesture of the user comprises to compare the downsampled data to the model gestures.

5. The gesture recognition device of claim 4, wherein the gesture recognition module is further to perform cluster analysis on downsampled training gesture data to generate the model gestures.

6. The gesture recognition device of claim 1, wherein the gesture data capture module is further to determine a beginning of the gesture and an end of the gesture, and wherein the gesture data comprises data captured after the beginning of the gesture and before the end of the gesture.

7. The gesture recognition device of claim 1, wherein to downsample the gesture data comprises to:
determine a window size based on the first number of data points; and
determine, for each of the second number of data points, a downsampled data point based on an average of data points of the gesture data in a corresponding window of the window size.

8. A method for gesture recognition with a gesture recognition device, the method comprising:
producing, by a gesture measurement device of the gesture recognition device, gesture data indicative of a gesture motion of a user of the gesture recognition device;
capturing, by the gesture recognition device, the gesture data from the gesture measurement device, wherein the gesture data is defined by a first number of data points;
acquiring, by the gesture recognition device, training data, wherein the training data is indicative of a plurality of training gesture data sets of a plurality of training users;
downsampling, by the gesture recognition device, each of the plurality of training gesture data sets to each of a plurality of numbers of data points;
performing, by the gesture recognition device, a gesture recognition algorithm on each of the plurality of training gesture data sets for each of the plurality of numbers of data points;
determining, by the gesture recognition device, a performance of the gesture recognition algorithm for each of the plurality of numbers of data points;
determining, by the gesture recognition device, a second number of data points based on the performance of the gesture recognition algorithm for each of the plurality of numbers of data points and prior to the capture of the gesture data;
downsampling, by the gesture recognition device, the gesture data from the first number of data points to the second number of data points to generate downsampled data, wherein the second number is predefined and less than the first number; and
recognizing, by the gesture recognition device and based on the downsampled data, a gesture of the user.

9. The method of claim 8, further comprising performing, by the gesture recognition device, an action based on the recognized gesture of the user.

10. The method of claim 8, further comprising generating model gestures based on the training data,
wherein recognizing the gesture of the user comprises comparing the downsampled data to the model gestures.

11. The method of claim 10, further comprising performing, by the gesture recognition device, cluster analysis on downsampled training gesture data to generate the model gestures.

12. The method of claim 8, further comprising determining, by the gesture recognition device, a beginning of the gesture and an end of the gesture, and wherein the gesture data comprises data captured after the beginning of the gesture and before the end of the gesture.

13. The method of claim 8, wherein downsampling the gesture data comprises:
determining a window size based on the first number of data points; and
determining, for each of the second number of data points, a downsampled data point based on an average of data points of the gesture data in a corresponding window of the window size.

14. One or more non-transitory machine-readable media comprising a plurality of instructions stored thereon that, when executed, cause a gesture recognition device to:
produce, by a gesture measurement device of the gesture recognition device, gesture data indicative of a gesture motion of a user of the gesture recognition device;
capture module to capture the gesture data from the gesture measurement device, wherein the gesture data is defined by a first number of data points;
acquire training data, wherein the training data is indicative of a plurality of training gesture data sets of a plurality of training users;
downsample each of the plurality of training gesture data sets to each of a plurality of numbers of data points;
perform a gesture recognition algorithm on each of the plurality of training gesture data sets for each of the plurality of numbers of data points;
determine a performance of the gesture recognition algorithm for each of the plurality of numbers of data points;
determine a second number of data points based on the performance of the gesture recognition algorithm for each of the plurality of numbers of data points and prior to the capture of the gesture data;
downsample the gesture data from the first number of data points to the second number of data points to generate downsampled data, wherein the second number is predefined and less than the first number; and
recognize, based on the downsampled data, a gesture of the user.

15. The one or more non-transitory machine-readable media of claim 14, wherein the plurality of instructions further cause the gesture recognition device to perform an action based on the recognized gesture of the user.

16. The one or more non-transitory machine-readable media of claim 14, wherein the plurality of instructions further cause the gesture recognition device to generate model gestures based on the training data,
wherein to recognize the gesture of the user comprises to compare the downsampled data to the model gestures.

17. The one or more non-transitory machine-readable media of claim 16, wherein the plurality of instructions further cause the gesture recognition device to perform cluster analysis on downsampled training gesture data to generate the model gestures.

18. The one or more non-transitory machine-readable media of claim 14, wherein the plurality of instructions further cause the gesture recognition device to determine a beginning of the gesture and an end of the gesture, and wherein the gesture data comprises data captured after the beginning of the gesture and before the end of the gesture.

19. The one or more non-transitory machine-readable media of claim 14, wherein to downsample the gesture data comprises to:
determine a window size based on the first number of data points; and
determine, for each of the second number of data points, a downsampled data point based on an average of data points of the gesture data in a corresponding window of the window size.

* * * * *